US007517493B2

(12) United States Patent
Duke et al.

(10) Patent No.: US 7,517,493 B2
(45) Date of Patent: *Apr. 14, 2009

(54) COOLING WATER CORROSION INHIBITION METHOD

(75) Inventors: Dan A. Duke, Temecula, CA (US); John L. Kubis, Mission Viejo, CA (US)

(73) Assignee: Water Conservation Technology International, Inc.

( * ) Notice: Subject to any disclaimer, the term of this patent is extended or adjusted under 35 U.S.C. 154(b) by 463 days.

This patent is subject to a terminal disclaimer.

(21) Appl. No.: 11/371,480

(22) Filed: Mar. 9, 2006

(65) Prior Publication Data

US 2006/0151394 A1 Jul. 13, 2006

Related U.S. Application Data

(60) Continuation-in-part of application No. 11/018,170, filed on Dec. 21, 2004, now Pat. No. 7,122,148, which is a division of application No. 10/754,797, filed on Jan. 9, 2004, now Pat. No. 6,929,749.

(51) Int. Cl.
*C23F 11/18* (2006.01)
*C23F 11/06* (2006.01)
(52) U.S. Cl. ............................. 422/3; 159/47.1; 203/10; 210/652; 210/687; 210/696; 422/13; 422/18
(58) Field of Classification Search ................... 422/13
See application file for complete search history.

(56) References Cited

U.S. PATENT DOCUMENTS

| 5,277,823 | A | | 1/1994 | Hann et al. |
| 5,403,521 | A | * | 4/1995 | Takahashi ..................... 261/26 |
| 5,985,152 | A | * | 11/1999 | Otaka et al. ................. 210/668 |
| 6,315,909 | B1 | * | 11/2001 | Hoots et al. ................. 210/745 |
| 6,334,955 | B1 | * | 1/2002 | Kawashima et al. ........ 210/636 |
| 6,402,957 | B1 | * | 6/2002 | Boyce ......................... 210/652 |
| 6,468,740 | B1 | * | 10/2002 | Oldsberg et al. .............. 422/15 |
| 6,537,456 | B2 | * | 3/2003 | Mukhopadhyay ........... 210/652 |
| 6,733,636 | B1 | * | 5/2004 | Heins ............................. 203/1 |
| 6,998,092 | B2 | * | 2/2006 | Duke et al. ..................... 422/3 |
| 7,122,148 | B2 | * | 10/2006 | Duke et al. ..................... 422/3 |
| 7,157,008 | B2 | * | 1/2007 | Owens ......................... 210/709 |

OTHER PUBLICATIONS

Strumm, et al.; "Formation of Polysilicates as Determined by Coagulation Effects"; Environmental Science and Technology; 1967; Vo. 1, 221-227.
Rozenfeld, I.L.; "Corrosion Inhibitors"; 1981; McGraw Hill; 171-174.
The NALCO Water Handbook; 1979; Chapter 3, p. 14 and 16.
Drew; Principles of Industrial Water Treatment; Sixth Edition; 1983; Chapter 3, pp. 43 and 64.
Boffardi, Bennett P., PhD; Calgon Internal Publication; 1988; Chapter 4; pp. 30-31.
Iler, R K, The Chemistry of Silica, 1979 Wiley, pp. 4-6, 10-15, 22-23, 30-31, 40-43, 46-51, 54-55, 74-75, 82-89, 92-93, 116-117, 124-145, 160-163, 174-177, 188-189, 194-197, 204-205, 212-215, 218-219, 312-317, 324-325, 354-361, 366-369, 374-377, 554-559.
Incopini, G A, Kinetics of Silica Oligomerization and Nanocolloid Formation as a Function of pH and Ionic Strength at 25o C, Penn State U., Dept of Geosciences, pub. Geochimica Et Cosmochimica ACTA, vol. 69, No. 2, pp. 293-303 (2005).
Icenhower, J P, The Dissolution Kinetics of Amorphous Silica in Sodium Chloride Solution: Effects of temperature & Ionic Strength, Geochimica Et Cosmochimica ACTA vol. 64 (24), pp. 4193-4203 (2000).
Klein, R, Charge Stabilized Colloidal Suspensions, Pure Applied Chem., vol. 73, No. 11, pp. 1705-1719, (2001).
Grier, D G, Interactions and Dynamics in Charge-Stabilized Colloid, MRS Bulletin 23, pp. 24-31 (1998).
Kallay, N, Introduction of the Surface Complexation Model into the Theory of Colloid Stability, Croatia Chemica ACTA, CCACAA 74 (3) pp. 479-797 (2001).
Kirby, B J, Zeta Potential of Microfluidic Substrates, Electrophoresis 2004, 25, pp. 187-202.
Barr, T L, U. Wisconsin-Milwaukee, Modification and Characterization of Mineralization Surface for Corrosion Protection, (www.elisha.com/docs/CorrosionProtection.pdf, Jan. 2006 dl).
Mauritz, K, Sol Gel Chemistry, U. Southern Mississippi, School of Polymers, (www.psrc.usm.edu/mauritz/solgel.html, Jan. 2006 dl).
Gillet, S L, Toward a Silicate-Based Molecular Nanotechnology I, Mackay School of Mines, U. Nevada Reno (1998), (www.foresight.org/conference/MNT05/Papers/Gillet1/Index.html, Jan. 2006 dl).
Gillet, S L, Toward a Silicate-Based Molecular Nanotechnology II, Mackay School of Mines, U. Nevada Reno (1998), (www.foresight.org/conference/MNT05/Papers/Gillet2/Index.html, Jan. 2006 dl).
U. of Aberdeen, UK, Silicification in Hot Spring Environments, Learning Resource Site, (www.abdn.uc.uk/rhynie/sinter.htm#silici, Jan. 2006 dl).
Stumm, W, Formation of Polysilicates as Determined by Coagulation Effects, Environmental Science and Technology, vol. 1, 221-227, 1967.

* cited by examiner

*Primary Examiner*—Peter A Hruskoci
(74) *Attorney, Agent, or Firm*—Stetina Brunda Garred & Brucker (57) ABSTRACT

Methods for inhibiting corrosion in aqueous evaporative systems where soluble silica ($SiO_2$) is maintained at residuals between 10 Mg/L and saturation, but more preferably maintained at greater than 300 mg/L as $SiO_2$, to provide corrosion inhibiting silica films that protect system metals. Silica is provided by evaporation of water and subsequent concentration and transformation of silica naturally contained in source water. The methods of the present invention provide highly effective inhibition of corrosion for mild steel, copper, stainless steel, aluminum, zinc, galvanized steel and various alloys of such metals. The methods of the present invention comprise pretreatment removal of polyvalent metal ions from the makeup source water, maintenance of concentration of monovalent metal ions, and controlling pH at a minimum of 7.0 in the presence of an elevated temperature aqueous environment. Thereafter, specified water chemistry residual ranges are maintained in the aqueous system to achieve inhibition of scale and corrosion.

19 Claims, No Drawings ic # COOLING WATER CORROSION INHIBITION METHOD

CROSS-REFERENCE TO RELATED APPLICATIONS

The present application is a continuation-in-part of U.S. patent application Ser. No. 11/018,170, filed Dec. 21, 2004 now U.S. Pat. No. 7,122,148, which is a division of U.S. patent application Ser. No. 10/754,797 filed on Jan. 9, 2004, now U.S. Pat. No. 6,929,749, entitled Cooling Water Scale and Corrosion Inhibition, the teachings of each being expressly incorporated herein by reference.

STATEMENT RE: FEDERALLY SPONSORED RESEARCH/DEVELOPMENT

Not Applicable

BACKGROUND OF THE INVENTION

Silica has been one of the major scale and fouling problems in many processes using water. Silica is difficult to deal with because it can assume many low solubility chemical forms depending on the water chemistry and metal surface temperature conditions. Below about pH 9.0, monomeric silica has limited solubility (125-180 mg/L as $SiO_2$) and tends to polymerize as these concentrations are exceeded to form insoluble (amorphous) oligomeric or colloidal silica. At higher pH, particularly above about pH 9.0, silica is soluble at increased concentrations in the monomeric, oligomeric (or silicate) and colloidal forms of silica. Since conversion can be slow, all of these forms may exist at any one time. The silicate ion can react with polyvalent cations like magnesium and calcium commonly present in process waters to produce salts with very limited solubility. Thus it is common for a mixture of many forms to be present: monomeric, oligomeric and colloidal silica; magnesium silicate, calcium silicate and other silicate salts.

To address such problem, methods for controlling deposition and fouling of silica or silicate salts on surfaces in a aqueous process have been derived and include: 1) inhibiting precipitation of the material from the process water; 2) maintaining an aqueous chemical environment that supports formation and stability of increased residuals of soluble silica species; and 3) producing a non-adherent form of silica precipitants in the bulk water. The exact mechanism by which specific scale inhibition methods of the present inventions function involves a number of complex variables and is not well understood. Limitations with silica deposition prevented exploration of silica chemistry, particularly at higher concentrations, as a potential corrosion inhibitor. The recent teachings of methods to control silica deposition by Duke et al. in U.S. Pat. Nos. 6,929,749; 6,949,193; and 6,998,092 have permitted current discovery of silica chemistry for corrosion inhibition. The teachings of all such patents are expressly incorporated herein by reference.

In industrial application, most scale and corrosion control methods used in aqueous systems typically rely on the addition of a scale and corrosion inhibitor in combination with controlled blowdown wastage of system water to prevent scale and corrosion problems. In this regard, the major scale formation potentials are prevalently contributed by the quantity of hardness (calcium and magnesium) and silica ions contributed by the source water, while the major corrosive potential results from the ionic or electrolytic strength that is concentrated from the source water by evaporation, or by chemicals (such as acid) added to the system water to control hardness deposition.

Treatment methods to minimize corrosion have further generally relied on the addition of chemical additives that inhibit corrosion through suppression of corrosive reactions occurring at either the anode or the cathode present on the metal surface, or combinations of chemical additives that inhibit reactions at both the anode and cathode. The most commonly applied anodic inhibitors include chromate, molybdate, orthophosphate, nitrite and silicate; whereas the most commonly applied cathodic inhibitors include polyphosphate, zinc, organic phosphates and calcium carbonate.

In view of toxicity and environmental concerns, the use of highly effective heavy metal corrosion inhibitors, such as chromate, have been strictly prohibited and most methods now rely on a balance of the scale formation and corrosive tendencies of the system water and are referred to in the art as alkaline treatment approaches. This balance, as applied in such treatment approaches, is defined by control of system water chemistry with indices such as LSI or Ryznar, and is used in conjunction with combinations of scale and corrosion inhibitor additives to inhibit scale formation and optimize corrosion protection at maximum concentration of dissolved solids in the source water. These methods, however, are still limited by the maximum concentration of silica and potential for silicate scale formation. Moreover, corrosion rates are also significantly higher than those available with use of heavy metals such as chromate. Along these lines, since the use of chromate and other toxic heavy metals has been restricted, as discussed above, corrosion protection has generally been limited to optimum ranges of 2 to 5 mils per year (mpy) for carbon steel when treating typical source water qualities with current corrosion control methods. Source waters that are high in dissolved solids or are naturally soft are even more difficult to treat, and typically have even higher corrosion rates.

In an alternative approach, a significant number of methods for controlling scale rely on addition of acid to treated systems to control pH and reduce scaling potentials at higher concentrations of source water chemistry. Such method allows for conservation of water through modification of the concentrated source water, while maintaining balance of the scale formation and corrosive tendencies of the water. Despite such advantages, these methods have the drawback of being prone to greater risk of scale and/or corrosion consequences with excursions with the acid/pH control system. Moreover, there is an overall increase in corrosion potential due to the higher ionic or electrolytic strength of the water that results from addition of acid ions that are concentrated along with ions in the source water. Lower pH corrosion control methods further rely on significantly higher chemical additive residuals to offset corrosive tendencies, but are limited in effectiveness without the use of heavy metals. Silica concentration must still be controlled at maximum residuals by system water wastage to avoid potential silica scaling.

In a further approach, source water is pretreated to remove hardness ions in a small proportion of systems to control calcium and magnesium scale potentials. These applications, due to unreliable pretreatment, have still relied on control of silica residuals at previous maximum guideline levels through blowdown water wastage to prevent silica scale deposits. Corrosion protection is also less effective with softened water due to elimination of the balance of scale and corrosion tendency provided by the natural hardness in the source water.

Accordingly, there is a substantial need in the art for methods that are efficiently operative to inhibit corrosion and scale formation that do not rely upon the use of heavy metals, extensive acidification and/or water wastage that are known and practiced in the prior art. There is additionally a need in the art for such processes that, in addition to being efficient, are extremely cost-effective and environmentally safe. Exemplary of those processes that would likely benefit from such methods would include evaporative cooling water systems where water is in contact with heat transfer surfaces, such as cooling tower systems, evaporative coolers, cooling lakes or ponds, and indirect cooling of enclosed or secondary cooling and heating loops. In each of these processes, heat is transferred to or from the water by heat transfer surfaces. In evaporative cooling water processes, heat is added to the water and evaporation of some of the water takes place. As the water is evaporated, the silica (or silicates) will concentrate and if the silica concentration exceeds its solubility, it can deposit to form either a vitreous coating or an adherent scale that can normally be removed only by laborious mechanical or chemical cleaning. Along these lines, at some point in the above processes, heat is extracted from the water, making any dissolved silica less soluble and thus further likely to deposit on surfaces, thus requiring removal. Accordingly, the teachings of Duke et al. on methods for preventing fouling of surfaces with silica or silicates, that further enables the use of higher levels of silica/silicates, has provided opportunity for discovery and improvement of corrosion inhibition methods with the use of silica concentrated from natural source waters. In this respect for cooling water, an inhibition method has long been sought after that would enable silica to be used as a non-toxic and environmentally friendly corrosion inhibitor.

To address these specific concerns, the current practice in these particular processes is to limit the silica or silicate concentration in the water so that deposition from these compounds does not occur. For example in cooling water, the accepted practice is to limit the amount of silica or silicates to about 150 mg/L, expressed as $SiO_2$. Reportedly, the best technology currently available for control of silica or silicates in cooling water is use of various low molecular weight polymers, or various organic phosphate chemistries, and combinations thereof. Even with use of these chemical additives, however, silica is still limited to 180 mg/L in most system applications. Because in many arid areas of the U.S. and other parts of the world make-up water may contain from 50-90 mg/L silica, cooling water can only be concentrated to 2 to 3 times such levels before the risk of silica or silicate deposition becomes too great. A method that would enable significant water conservation of normal source waters, re-use of wastewater, and use of high silica content source waters for evaporative cooling water systems would be a great benefit.

SUMMARY OF THE INVENTION

The present invention specifically addresses and alleviates the above-identified deficiencies in the art, while improving upon the teachings of Duke et al. in related U.S. patents (U.S. Pat. Nos. 6,929,749; 6,949,193; and 6,998,092). In this regard, the invention relates to methods for controlling silica and silicate fouling problems while concurrently controlling the corrosion of system metallurgy (i.e., metal substrates) in aqueous systems with high concentrations of dissolved solids (high ionic strength). The corrosion potential of various source waters is generally a function of the concentration of corrosive ions (such as chloride and sulfate) and electrolytic (ionic) strength that are concentrated in aqueous evaporative systems that cool heat transfer surfaces. Accordingly, lower corrosive ion content in some source waters will reduce corrosion potential, and the level of protection needed from a corrosion inhibiting mechanism. The methods discovered can be applied proportionately to provide protection for such lower corrosion potentials, but more specifically, can provide significantly greater protection for aqueous system metals that encounter very high concentrations of corrosive ions and electrolytic strength. It is anticipated that this discovery will permit application at much greater concentrations of corrosive ions (ionic strength) without consequence of corrosion of aqueous system metals, while providing significant water conservation that will benefit both the applicant and environmental conservation. Prior art has not enabled undertaking such water conservation, due to ineffective corrosion protection and lack of a cost effective process.

More particularly, the invention is directed to the removal of polyvalent metal (PVM) ions from the source water, controlling specified method chemistry residuals in the aqueous evaporative system to prevent deposition of PVM silicate or silica scales on system surfaces, and preventing PVM interference with corrosion inhibiting mechanisms used by the methods that inhibit corrosion of system metallurgy. To that end, we have unexpectedly discovered that the difficult silica and silicate scaling problems that occur in aqueous systems when silica residuals exceed solubility, and more preferably are approaching or greater than the solubility of amorphous silica, following concentration of total available silica species contained in source water, can be controlled by initially removing PVM ions (prevalently, calcium and magnesium) from the makeup source water (i.e., water fed to the aqueous system) using pretreatment methods known in the art, such as through the use of ion exchange resins, selective ion removal with reverse osmosis, reverse osmosis, electrochemical removal, chemical precipitation, or evaporation/distillation. Preferably, the pretreatment methods of the present invention will maintain the total PVM in the makeup water at less than 10% of the makeup total available silica residual (mg/L $SiO_2$), as determined from an initial assessment of the source water. In some embodiments, the total PVM ions will be maintained at less than 2% of the makeup silica residual.

We have unexpectedly discovered that the excessive corrosion of mild steel, copper, stainless steel, aluminum, zinc, galvanized steel and various alloys of such metals that contact water in aqueous systems, that results from high concentrations of corrosive ions or electrolytic potential (ionic strength) contributed by concentration of dissolved solids in source water in aqueous evaporative cooling systems, can likewise be controlled by the methods of the present invention. Evaporative cooling systems that would likely benefit from such methods would include, but are not limited to, evaporative cooling water systems where water is in contact with heat transfer surfaces, such as cooling tower systems, evaporative coolers, cooling lakes or ponds, and indirect cooling of enclosed or secondary cooling and heating loops. In such context, the methods of the present invention comprises removing polyvalent metal (PVM) ions (prevalently, calcium and magnesium) from the makeup source water using known pretreatment methods of the present inventions, such as ion exchange resins, selective ion removal with reverse osmosis, reverse osmosis, electrochemical removal, chemical precipitation, or evaporation/distillation. The pretreatment methods of the present invention will preferably maintain the total PVM ratio in the makeup water at less than 10%, and preferably at least less than 2%, of the makeup silica residual (mg/L $SiO_2$), as determined from an initial analysis of the source water. When source makeup water PVM content is naturally very low, pretreatment removal of PVM ions may be bypassed in some systems.

Alkalinity (hydroxyl ion concentration) is then controlled (as quantified by relation to pH) at 7.0 pH or higher, with a pH of 8.0 or higher being more highly preferred in some applications along with control of soluble silica at residual concentrations approaching or exceeding solubility, but not less than 10 mg/L, with control at more highly desired residuals in some applications exceeding 300 mg/L as $SiO_2$. With respect to the latter, the $SiO_2$ in the source water may be supplemented initially to attain desired residual concentrations by the addition of a silica monomer or soluble silicate. However, optimum residual concentrations may be attained by simply removing a portion of the aqueous system water through such well known techniques or processes as evaporation and/or distillation.

Further, the monovalent metal (MVM) ion concentration is controlled so as to have at minimum a concentration that exceeds the soluble silica concentration, but preferably is in the concentration range of 0.1 N to 0.2 N for total MVM ions. Such control may be provided by concentration of specifically pre-treated makeup source water or a supplemental feed of MVM salts or MVM alkalinity chemicals directly to the aqueous system. A further preferred embodiment in some applications would be to control the MVM ion concentration such that it is equal to or greater than 0.3 N, to enable corrosion protection at reduced soluble silica concentrations.

Further, we have discovered that in combination with the application of these steps in pre-treatment and aqueous system chemistry control, when applied in evaporative aqueous systems with higher bulk water temperature than source water makeup temperatures, and also in aqueous contact with higher temperature heat transfer surfaces, further enhancement of corrosion protection is provided with the method process for corrosion inhibition of metal substrates contacted by the aqueous system. This combination of steps enables the transformation of natural monomeric and colloidal silica contained in source water to establish and control stable residuals of corrosion inhibiting silica forms and particle sizes required to provide exceptional corrosion protection of metals.

DETAILED DESCRIPTION OF THE INVENTION

The detailed description set forth below is intended as a description of the presently preferred embodiment of the invention, and is not intended to represent the only form in which the present invention may be constructed or utilized. The description sets forth the functions and sequences of steps for constructing and operating the invention. It is to be understood, however, that the same or equivalent functions and sequences may be accomplished by different embodiments and that they are also intended to be encompassed within the scope of the invention.

In relation to discussions of silica chemistry of this method invention, and variations in terminology by references cited, the following terms will generally apply. Soluble silica (or monosilicic acid), expressed as $Si(OH)_4$, generally refers to soluble monomeric silica in water as monosilicic acid, and is characterized by reaction with molybdic acid to form yellow silicomolybdic acid. Oligomers (or polysilicic acid) are the various polymers with molecular weights (as $SiO_2$) up to 100,000 consisting of hydrated "active" silica or dense spherical particles. Colloidal silica refers to more highly polymerized species and particles that generally exceed 100,000 molecular weight. Silica sols (or sol-gels) may refer broadly to either polysilicic acid or colloidal silica. Silicate generally refers to silica particles that combine or stabilize as charged particles with metal ions or adsorb on their salts.

The following summation of silica polymerization and particle growth chemistry, and application in commercial sol-gel processes for synthesizing various colloidal sol species, was extracted from the publication by Mauritz. His discussion relates the comparable mechanisms that occur with use or evaporative concentration of MVM alkaline bases (such as sodium carbonate or sodium hydroxide) that function as base-catalysts in the aqueous system environment as disclosed in this current method discovery. Mauritz also relates his discussion to R. K. Eiler's earlier descriptions of silica chemistry which frequently present sodium chemistry and it's impact on kinetics of silica polymerization, particle growth and sol formation. Thus, his summation provides useful perspective to the complex mechanisms that are controlled by the current methods of this invention.

Sol Gel Chemistry—K. A. Mauritz

The sol-gel process, as the name implies, involves the evolution of inorganic networks through the formation of a colloidal suspension (sol) and gelation of the sol to form a network in a continuous liquid phase (gel). The precursors for synthesizing these colloids consist of a metal or metalloid element surrounded by various reactive ligands. Metal alkoxides are most popular because they react readily with water.

At the functional group level, three reactions are generally used to describe the sol-gel process: hydrolysis, alcohol condensation, and water condensation. The kinetic impact of pH, nature and concentration of catalyst, H2O/Si molar ratio (R) and temperature have been identified as most important in these reactions. However, the characteristics and properties of a particular sol-gel inorganic network are related to additional factors that affect the rate of hydrolysis and condensation reactions, such as, pH, temperature and time of reaction, reagent concentrations, catalyst nature and concentration, H2O/Si molar ratio (R), aging temperature and time.

In general, the hydrolysis reaction (Eq. 1), through the addition of water, replaces alkoxides groups (OR) with hydroxyl groups (OH). Subsequent condensation reactions (Eqs. 2a and 2b) involving the silanol groups (Si—OH) produce siloxane bonds (Si—O—Si) plus the by-products water or alcohol. Under most conditions, condensation commences before hydrolysis is complete. However, conditions such as, pH, H2O/Si molar ratio (R) and catalyst can force completion of hydrolysis before condensation begins.

Hydrolysis/pH

Iler divides this polymerization process into three pH domains: <pH 2, pH 2-7, and >pH 7. However, regardless of pH, hydrolysis occurs by the nucleophilic attack of the oxygen contained in water on the silicon atom:

Nature and Concentration of Catalyst

Although hydrolysis can occur without addition of an external catalyst, it is most rapid and complete when they are employed. Additionally, it has been observed that the rate and extent of the hydrolysis reaction is most influenced by the strength and concentration of the acid or base catalyst. Therefore, compared to acidic conditions, base hydrolysis kinetics is more strongly affected by the nature of the solvent.

Acid-Catalyzed Hydrolysis

Under acidic conditions, it is likely that an alkoxide group is protonated in a rapid first step. Electron density is withdrawn from the silicon atom, making it more electrophilic and thus more susceptible to attack from water.

Base-Catalyzed Hydrolysis

Base-catalyzed hydrolysis of silicon alkoxides proceeds much more slowly than acid-catalyzed hydrolysis at an equivalent catalyst concentration. Basic alkoxide oxygens tend to repel the nucleophile, —OH. However, once an initial hydrolysis has occurred, further reactions proceed stepwise, with each subsequent alkoxide group more easily removed from the monomer then the previous one. Therefore, more highly hydrolyzed silicones are more prone to attack. Additionally, hydrolysis of the forming polymer is more sterically hindered than the hydrolysis of a monomer. Although hydrolysis in alkaline environments is slow, it still tends to be complete and irreversible.

H2O/Si Molar Ratio (R)

Thus, under basic conditions, it is likely that water dissociates to produce hydroxyl anions in a rapid first step. The hydroxyl anion then attacks the silicon atom.

Nonetheless, the most obvious effect of the increased value of R is the acceleration of the hydrolysis reaction. Additionally, higher values of R cause more complete hydrolysis of monomers before significant condensation occurs. Differing extents of monomer hydrolysis should affect the relative rates of the alcohol or water producing condensation reactions. Generally, with under stoichiometric additions of water (R<2), the alcohol-producing condensation mechanism is favored, whereas, the water-forming condensation reaction is favored when $R^3$ 2.28.

Polymerization to form siloxane bonds occurs by either an alcohol-producing or a water-producing condensation reaction. It has been shown by Engelhardt et al. that a typical sequence of condensation products is monomer, dimer, linear trimer, cyclic trimer, cyclic tetramer, and higher order rings. This sequence of condensation requires both depolymerization (ring opening) and the availability of monomers which are in solution equilibrium with the oligomeric species and/or are generated by depolymerization (reverse of Eqs. 2a and 2b).

The rate of these ring opening polymerizations and monomer addition reactions is dependent upon the environmental pH. In polymerizations below pH 2, the condensation rates are proportional to the [H+] concentration. Because the solubility of silica is quite low below pH 2, formation and aggregation of primary silica particles occur together and ripening (i.e., growth of a network) contributes little to growth after particles exceed 2 nm in diameter. Thus, developing gel networks are composed of exceedingly small primary particles.

It is generally agreed that between pH 2 and pH 6, condensation rates are proportional to [—OH] concentrations. Condensation preferentially occurs between more highly condensed species and those less highly condensed and somewhat neutral. This suggests that the rate of dimerization is low, however, once dimers form, they react preferentially with monomers to form trimers, which in turn react with monomers to form tetrameters. Cyclization occurs because of the proximity of the chain ends and the substantial depletion of the monomer population. Further growth occurs by addition of lower molecular weight species to more highly condensed species and aggregation of the condensed species to form chains and networks. The solubility of silica in this pH range is again low and particle growth stops when the particles reach 2-4 nm in diameter.

Above pH 7, polymerization will occur as in the pH 2 to pH 6 ranges. However, in this pH range, condensed species are ionized and therefore, mutually repulsive. Growth occurs primarily through the addition of monomers to the more highly condensed particles rather then by particle aggregation. Due to the greater solubility of silica and the greater size dependence of solubility above pH 7, particles grow in size and decrease in number as highly soluble small particles dissolve and reprecipitate on larger, less soluble particles. Growth stops when the difference in solubility between the smallest and largest particles becomes indistinguishable. This process is referred to as Ostwald ripening. Particle size is therefore, mainly temperature dependent, in that higher temperatures produce larger particles. Additionally, in this pH range, the growth rate depends upon the particle size distribution.

Nature and Concentration of Catalyst

As with hydrolysis, condensation can proceed without catalyst, however, their use in organosiloxanes is highly helpful. Furthermore, the same type catalysts are employed: generally those compounds which exhibit acidic or basic characteristics.

It has been shown that condensation reactions are acid and base specific. In addition, Iler has shown that under more basic conditions, gel times are observed to increase. Condensation reactions continue to proceed, however, gelation does not occur. Again, catalysts which dictate a specific pH can and do drive the type of silica particle produced as seen in the previous discussion on pH.

Acid-Catalyzed Mechanism

It is generally believed that the acid-catalyzed condensation mechanism involves a protonated silanol species. Protonation of the silanol makes the silicon more electrophilic and thus susceptible to nucleophilic attack. The most basic silanol species (silanols contained in monomers or weakly branched oligomers) are the most likely to be protonated. Therefore, condensation reactions may occur preferentially between neutral species and protonated silanols situated on monomers, end groups of chains, etc.

Base-Catalyzed Mechanism

Figure 10:
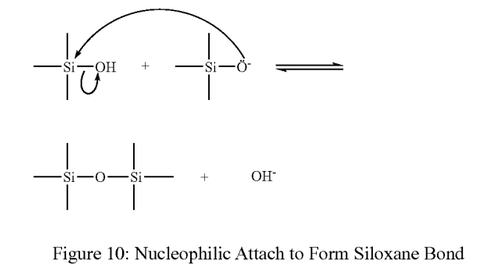

The most widely accepted mechanism for the base-catalyzed condensation reaction involves the attack of a nucleophilic deprotonated silanol on a neutral silicic acid:

Figure 10: Nucleophilic Attach to Form Siloxane Bond

Furthermore, it is generally believed that the base-catalyzed condensation mechanism involves penta- or hexa-coordinated silicon intermediates or transition states, similar to that of a SN2 type mechanism.

Within the context of these stages, many factors affect the resulting silica network, such as, pH, temperature and time of reaction, reagent concentrations, catalyst nature and concentration, H2O/Si molar ratio (R), aging temperature and time.

Summary

According to Iler, Sol-gel polymerization occurs in three stages: (1) Polymerization of monomers to form particles. (2) Growth of particles. (3) Linking of particles into chains, then networks that extend throughout the liquid medium, thickening into a gel.

Within the context of these stages, many factors affect the resulting silica network, such as, pH, temperature and time of reaction, reagent concentrations, catalyst nature and concentration, H2O/Si molar ratio (R), aging temperature and time. However, it can generally be said that sol-gel derived silicon oxide networks, under acid-catalyzed conditions, yield primarily linear or randomly branched polymers which entangle and form additional branches resulting in gelation. However, silicon oxide networks derived under base-catalyzed conditions yield more highly branched clusters which do not interpenetrate prior to gelation and thus behave as discrete clusters.

The presence of polyvalent metal (PVM) cations reduces the solubility of silica to very low levels, forming metal silicates that can scale heat transfer surfaces and interfere with potential corrosion protective mechanisms formed by silica. According to the present invention, there is disclosed methods for inhibiting silica and silicate scale in aqueous systems and providing exceptional metal corrosion protection that comprise the removal of the prevalent PVM ions from the makeup source water prior to being fed into the aqueous system and thereafter controlling the aqueous system within specified water chemistry control ranges. PVM ions (typically calcium and magnesium) are removed from the makeup source water using pretreatment methods known in the art, which include methods such as ion exchange resins, selective ion removal with reverse osmosis, reverse osmosis, electrochemical removal, chemical precipitation, or evaporation/distillation. PVM ions such as those from iron, manganese, copper, zinc, barium, and aluminum are usually at low concentrations in treated municipal and well source waters used for make up to cooling systems. Such low level concentrations will not typically require removal (although the soluble forms may be removed by some calcium and magnesium removal processes). However, some water sources such as well, wastewater, reclaimed or untreated surface waters may have higher residuals of these metals as well as other objectionable materials. Such waters may require pretreatment with alternative methods for reduction of these PVM ions in addition to the pretreatment methods specified for removal of the more prevalent high concentrations of calcium and magnesium ions.

As a result, control or minimization of PVM salt insolubility in the aqueous system (for example, $CaCO_3$ at less than 35 Mg/L at 25 degrees C.) will prohibit formation of the insoluble salts and precipitation on heat transfer surfaces, and permit increased solubility of various silica forms in contact with the elevated temperatures of heat transfer surfaces. It should be noted that although PVM salts decrease in solubility at a given concentration with increasing temperature, their solubility increases in the presence of higher concentrations (ionic strength) of the more soluble MVM salts. The present methods thereby eliminate potential reaction of insoluble silica forms with PVM salt deposits on system surfaces and their nucleation sites that initiate silica or silicate insoluble precipitation.

The pretreatment methods will preferably maintain the total polyvalent metal (PVM) ion ratio in the makeup water at less than 10% of the makeup total available silica residual (mg/L $SiO_2$). In a more highly preferred embodiment, the pretreatment methods will maintain the total PVM ions present in the makeup water at less than 2% of the makeup total available silica residual. With greater reduction of PVM ions in source water, greater reduction in aqueous system water wastage will be possible without exceeding respective solubility and precipitation of concentrated PVM salts (for example, less than 35 Mg/L for $CaCO_3$ at 25 degrees C.). As will be appreciated by those skilled in the art, the total available silica residual can be readily determined by utilizing known techniques, and will preferably be determined prior to the application of the methods of the present invention.

In the absence of a coagulant (such as low solubility PVM salts), silica is not precipitated from solution at any pH, but forms an amorphous gel structure at sufficient concentration. Although MVM salts are highly soluble, and seldom precipitate as salts that could act as coagulants, they do affect the rate of polymerization of monosilicic acid and accelerate gelling of silica sols (or deposition on metal surfaces) at a given solution. pH, alkalinity and temperature. In neutral solutions, such as sea water, salt content will catalyze the rate of dissolution of silica. Dissolution of quartz increases proportionately in NaCl at $10^{-3}$, $10^{-2}$ and $10^{-1}$ N concentrations. As is frequently true of catalysts in chemical reaction kinetics, the counter effect on solubility and deposition of silica is also expected at equilibrium solubility conditions. When approaching saturated concentrations of silica, increasing MVM ion residuals will accelerate the deposition process. Amorphous silica (including all equilibrium species) deposition occurs on receptive surfaces from dilute silica sols when conditions of pH and salt concentration are close to those causing coagulation or precipitation. The silica concentration preferably should not be so high (over saturated or unstable) that particles adhere (aggregate) to one another rather than to the metal surfaces. Thus, MVM ion salt concentration contributes to the desired surface deposition and corrosion inhibition process by limiting silica particle concentration and aggregation (stability), as well as catalytic impact on growth of silica monomer to larger particles (amorphous species equilibrium).

We believe the control of MVM ion concentrations in the aqueous system such that concentrations of the MVM ions (prevalently, sodium or potassium) exceed the concentration of $SiO_2$ ions in the aqueous water system is beneficial to transformation of source water silica and control of corrosion inhibiting residual species. The complicated chemistry of silica and colloidal silica behavior is not well understood, but studies of the related effects of MVM ionic strength (or associated counterion strength) on the reaction kinetics (such as shown by the DLVO model) involved in the growth and stability of molecular and colloidal forms of silica has been established by research of experts in the field. Amorphous silica precipitation or gel layer films on metal surfaces are in equilibrium concentration at given conditions of saturated soluble $SiO_2$ concentration, temperature, pH>7 and MVM ion concentration. Amorphous precipitation and gel films are reversible (soluble) with dilution or lowering of silica and/or MVM concentration, or increase in pH.

In the absence of MVM salts, stability of silica sols above pH 8.0 would limit gel formation on metal surfaces and protection from corrosion. Although under equilibrium conditions the degree of silica that can be dissolved is limited even at high pH, high silica sols (>4:1 Na:Si) can be metastable at lower pH (8-10). Such sols can undergo little change over timescales of months and even years, because electrostatic repulsion and (probably) mutual steric hindrance inhibits the crosslinking of the colloidal particles (Healy, 1994). Metastability is also achieved by techniques for increasing the size of the colloidal particles, which inhibits the gelling kinetics (Iler, 1979, Ch. 4). Total MVM ion concentration, preferably sodium, should be controlled at residuals that exceed the soluble silica residual, but preferably is controlled in the concentration range of 0.1 to 0.2 M for total MVM ions. Control of MVM ion concentration may be conducted through reduction or elimination of blowdown wastage from the system, thereby concentrating through evaporation those MVM ions naturally present in the source water and those exchanged during removal of multivalent metal ions in the pre-treatment process. In a more highly preferred embodiment, the MVM ion concentration will be maintained at greater than 0.3 N concentration of the MVM neutral salt (such as sodium chloride) or an MVM alkaline salt (such as sodium carbonate). MVM ion concentration levels attained in method treated systems will depend upon system capability to concentrate source water, and the concentration of MVM in the pre-treated or natural source water. Addition of MVM salts or alkalinity agents such as sodium chloride, sodium carbonate, sodium hydroxide or the potassium counterparts may be required to attain control residuals. As residuals of MVM ions are increased, silica stability equilibrium is reduced and the total concentration of soluble silica required to reach equilibrium concentration with amorphous silica is reduced. Concentrations greater than 0.3 N of MVM may lead to precipitation of excess silica as amorphous silica, in addition to lowering soluble (stable) silica residuals required to attain equilibrium of various silica species with amorphous silica. Thus, soluble silica residual required for optimum protection of metal surfaces is reduced, and equilibrium concentration required for maintaining a low porous silica gel barrier on metal surfaces is provided. The critical coagulation concentration is reached at lower concentrations with MVM salts of sodium than with potassium or lithium ions. Thus, higher normality concentrations would be required for potassium and other MVM ions to achieve the same effect as sodium on silica concentration and equilibrium stability.

Aqueous system pH is maintained at 7.0 or greater as contributed by the concentration of alkalinity in the source water by evaporation or distillation of water, or through supplemental addition of an MVM alkalinity agent, such as sodium carbonate, to the system when required. The minimum pH will provide sufficient hydroxyl ions to catalyze particle growth of the corrosion inhibiting silica forms from total available monomer and colloidal particles in the source water. The condensation reaction of silica is catalyzed by hydroxyl ions, which accelerates polymerization and particle growth. The catalytic effect on particle growth and gel formation increases with increased pH up through 10.7 where amorphous $SiO_2$ dissolves. Solubility and stability of the polymeric silica and colloidal silica particles formed increase with pH, and thus supports higher residuals of silica in equilibrium with amorphous silica and the related gel formation on metals for corrosion protection. The higher "soluble silica" residuals, measured as monomeric silica, increase significantly in the 9.0 to 10.7 pH range due to the formation of soluble silicate ions in addition to monomer, that are both measured by the acid molybdate test. In the absence of MVM salts, stability of silica sols above pH 8.0 would limit gel formation on metal surfaces and resultant protection from corrosion. Along these lines, in certain preferred embodiments of the present invention, the pH may be raised and maintained at levels of 8.0 of higher, while in the presence of certain specified MVM salt concentrations.

To support corrosion inhibition, soluble silica residuals will preferably be maintained in the aqueous system at levels approaching or exceeding saturation, but not less than 10 mg/L, as contributed by the concentration of natural total available monomeric and colloidal silica from the source water that is contributed by makeup to the aqueous evaporative cooling system. Silica, which generally occurs and is measured in the form of monosilicic acid in natural source waters, is generally "inert" in neutral solutions below soluble saturation concentrations. Thus, it does not contribute to effective corrosion inhibiting deposition or film formation by itself without chemical transformation. Adjunct forms of silica monomer or silicates silica may be added initially to supplement the silica in the source water and establish desired $SiO_2$ concentrations for the method in the aqueous system. In certain applications, such levels may be maintained at levels of greater than 300 mg/L soluble silica. Silica concentrations that exceed solubility at given aqueous system conditions and in equilibrium with amorphous silica will support corrosion inhibition for metals, and more particularly, inhibit corrosion of mild steel to less than 0.3 mpy and less than 0.1 mpy for copper, stainless steel and various alloys of these metals contacted by water in the aqueous system. The preferred ranges of the method will also provide corrosion protection at less than 0.5 mpy for soft metals such as aluminum, zinc and galvanized steel and various alloys of these metals. The method will also control mild steel corrosion at less than 5 mpy (less than 0.3 mpy for copper) in treated systems where silica residuals are controlled at less than soluble saturation, but corrosion inhibition is increasingly effective with the method when approaching amorphous $SiO_2$ equilibrium concentration at a given pH, MVM ion concentration, and temperature.

With respect to the mechanisms by which the methods of the present inventions effectively achieve their results, excess source water silica (beyond the solubility of silica attained at given pH, temperature and MVM salt concentrations in equilibrium with amorphous silica) is either adsorbed as nonadherent precipitates that form following reaction with small amounts of metals (Ca, Mg, Fe, Al, Zn) introduced into the aqueous system by source water and scrubbed from the air by the tower system, or precipitated as amorphous silica when $SiO_2$ solubility is exceeded in the presence of higher concentrations (>0.3 molar) of MVM salts. The adsorption and precipitation of high ratios of silica on small amounts of solids such as magnesium hydroxide has been demonstrated by the Freundlich isotherms, and is commonly experienced in water treatment chemical precipitation processes. Thus, a small quantity of amorphous silica precipitate is removed from the circulating water through settling in the tower basin.

Solubility and stability of silica and colloidal silica particles increase with higher temperature (in the absence of PVM ions or salts, which are relatively insoluble, particularly at higher temperature). For example, soluble silica residuals as high as 660 Mg/L have been found in geothermal springs where temperatures were at 250 degrees C. The increased solubility of silica results from the impact of temperature on reaction kinetics, which increases both rate of polymerization and particle growth as temperature increases, and subsequently accelerates the rate of either aggregation or gel formation for deposition of corrosion inhibiting films on receptive heat transfer surfaces. This probably accounts for the absence of a significant increase in corrosion rates at higher temperatures with this method, which is not the case with prior art corrosion inhibiting mechanisms. Some metals like aluminum may form better protective films at higher temperatures with this method, and may permit application of such metals in new heat transfer applications that were not previously possible. Silica oligomers and colloidal silica particles are also meta-stable at lower temperatures, after being formed at higher temperatures, and thus may contribute to increased stabilization of a variety of silica particle sizes in the bulk aqueous circulating water that contribute to effective (non porous) corrosion inhibiting film formation on non heat transfer metal surfaces.

Relative to the methods of this discovery, the monomeric and colloidal species of silica found in natural source waters that do not contribute to corrosion inhibition at ambient surface water temperatures are transformed by the effects of temperature on reaction kinetics when introduced into the aqueous evaporative cooling system environment. First, when introduced with make up into higher bulk water temperatures in the aqueous evaporative cooling system, and secondly when continually being heated to even higher temperatures in water contacting the heat transfer surfaces that catalyze molecular and colloidal particle growth. Hydrated amorphous silica is formed at relatively low temperatures if monosilicic and oligosilicic acids in water are concentrated and polymerized by the presence of hydroxyl ions. Thus, silica transformation and particle growth is primarily impacted by the combined catalytic effect on reaction kinetics with control of hydroxyl ion concentration (particularly as pH increases above 7.0) in combination with increased temperatures provided in the aqueous environment. Studies at neutral pH have shown an approximate 1% increase in silica solubility per 1 degree C. temperature increase in the range from 0 to 100 degrees F. With even small increases in temperature and sufficient available hydroxyl ion concentration (preferred pH control ranges), the prolonged retention time provided through minimal wastage (blowdown) of method treated water from such aqueous systems (permitted by the methods of this invention), will maintain an aqueous catalytic environment to incrementally transition source water silica monomer and colloidal silica to the corrosion inhibiting molecular and colloidal particles. Thus, resultant inhibiting forms of soluble $SiO_2$ may gradually increase and approach saturation and equilibrium with solubility of solid amorphous silica at given aqueous conditions of the method.

Control of aqueous system chemistry, in particular with application at the preferred embodiment ranges of the present methods of the present inventions, will provide highly effective film formation (corrosion inhibiting barrier) and exceptional corrosion protection for mild steel, copper, stainless steel and various alloys of these metals (less than 0.3 mpy for mild steel, and less than 0.1 mpy for copper and stainless steel). The soft metals, like aluminum, zinc and galvanized steel generally require the preferred treatment ranges for effective corrosion protection. Moderately higher corrosion rates may be acceptable to end users when source water quality or the maximum evaporative concentrations attainable by the aqueous system do not permit establishment of soluble silica residuals at maximum concentration (approaching or exceeding amorphous $SiO_2$) in the method treated water. Such moderately elevated corrosion levels may be superior or equivalent to current art. Comparable corrosion rates for mild steel in aqueous systems with existing methods of the present inventions are optimally in the range of 2 to 5 mpy.

As alkalinity (hydroxyl ion concentration) is increased as related to pH levels greater than 7.0, and residuals of soluble silica are increased and approach saturation of soluble $SiO_2$, corrosion rates will be reduced to those values disclosed in related U.S. Pat. No. 6,998,092, the teachings of which are incorporated herein by reference. Maximum attainable concentration of source water chemistry may be limited by low evaporative load and/or uncontrollable system water losses (such as tower drift). If the end user does require lower corrosion rates, such results are attainable by supplemental addition of adjunct silica monomer or colloidal materials to the aqueous system to achieve desired residual, and support method process for transformation to inhibiting silica particles that approach saturation of soluble silica and solubility of solid amorphous silica.

Though not fully understood, several corrosion inhibition mechanisms are believed to be contributing to corrosion protection of metals now provided by the methods of the present invention. Such mechanisms are believed to provide a synergy of both anodic and cathodic inhibition functions that contribute to the corrosion inhibition process within the specified control ranges. Insoluble monomeric silica (supersaturated concentrations and pH below 6.0) forms an impervious glass-like film, whereas large colloidal particles form a porous film. In an intermediate range, where particles are smaller but approaching molecular dimensions, the coating is clear and the pores in the close-packed mass of particles may be so small that only water or certain ions can penetrate. Silica is probably deposited molecularly from supersaturated aqueous solution by either of two processes within method treated system control ranges; 1) concentrating an under saturated solution by evaporation of water, or 2) cooling hot saturated solution in water. The mechanism of molecular deposition of silica involves a condensation reaction catalyzed by hydroxyl ions and accelerated by the presence of MVM salts. Deposition is more rapid and condensation of the silica is more complete at higher solution and metal surface temperatures.

Control of soluble silica residuals at less than saturation with the method probably reduces the effectiveness of corrosion inhibition due to insufficient concentrations of the transformed particles (via polymerization and particle growth) to higher molecular weight and size that provide anodic or cathodic corrosion inhibition of metals. Increasing concentrations of soluble silica approaching saturation solubility for monomeric silica, accompanied by formation of various oligomeric and colloidal particle sizes are believed to provide increased passivation of metal surfaces initially through anodic protection afforded by the method. Although the proportions of such species formed in such aqueous equilibrium has not been determined, the continuous makeup of new monomeric and small colloidal particles in source water, and slow rate of transformation by the catalytic reaction kinetics in this process, would likely insure presence of oligomeric and colloidal species needed for reaction and film formation on receptive metal surfaces.

In this regard, an anodic corrosion inhibitor mechanism is believed to result from the increased and stable residuals of oligomeric and colloidal silica provided by the present methods, which are commonly referred to as silicates. Silicates inhibit aqueous corrosion by hydrolyzing to form negatively charged colloidal particles. These particles migrate to anodic sites and precipitate on the metal surfaces where they react with metallic ion corrosion products. The result is the formation of a self-repairing gel whose growth is self-limited through inhibition of further corrosion at the metal surface. Anodic inhibition is probably the principal mechanism at less than saturated silica residuals, and is dependent upon formation of sufficient concentration of silicate particles that can react with metal surfaces. The MVM ion concentration should be greater than the soluble silica concentration to facilitate and accelerate polymerization of silica at stable MVM ratios when silica is below saturation. This concentration of MVM ions is believed to function in the kinetics of polymerization of monomeric silica to oligomers and colloidal silicates that inhibit metal corrosion at such silica concentrations.

Unlike the monomeric silica form normally found in source water that does not provide corrosion inhibition by itself, the methods of the present invention provide such beneficial effect by control of the aqueous chemical environment to transform monomeric and smaller molecular or colloidal particles found in source waters to corrosion inhibiting forms and at sufficient stable concentrations to provide exceptional corrosion protection. Investigations of total available silica content in typical municipal waters from various geographic sources, using a procedure with elevated pH and temperature to further "digest" the samples to monomeric form, has shown "total available" low molecular weight silica forms may be significantly greater (50-300%) than detected by standard testing procedure with the molybdate method. This modified test technique is not believed to detect higher molecular weight forms of silica, which also are not naturally present in most surface water environments. In this respect, the removal of most source water PMV ions is operative to prevent reaction and adsorption of the inhibiting silica forms on metal oxide or metal salt precipitates from source water.

When equilibrium concentrations of soluble silica and amorphous silica are attained, the size range and concentration of molecular and stable colloidal particles is believed to provide the exceptional corrosion protection of this method through formation of a very non porous and protective cathodic film on all types of metal surfaces (mild steel, copper, stainless steel, aluminum, zinc, galvanized steel and other alloys of these metals). Examination of the molecular structure in the monomolecular layer at the metal surface and then further from the surface after formation of silica corrosion inhibitive films indicate that a number of different size polymeric and colloidal particles may be involved in effective non porous film development. In particular, the smallest silica polymer (dimer) may initially bond with metal oxides or hydroxides at the metal surface. Once this initial silica layer at the surface has formed, further silica growth continues by reaction with the base silica layer. Successive layers are added or grow (condense) from this foundation with addition of increasingly larger molecular and colloidal particles until sufficient layers of silica in the gel layer formation is self limited to further growth by insulation of base metal attraction. The variety of available particle sizes at stable concentrations provided by the method through the continuous transformation and growth of new particles from monomeric and other small particles introduced with source water make up, in addition to temperature effects previously noted, may be functional to the effective filling of gel layer pores and formation of a very non porous surface film that is highly resistant to penetration by corrosive ions. The resultant effective formation and control of sufficient stable residuals of corrosion inhibiting silica molecular and colloidal particles with such methods of the present invention has not heretofore been available.

The extensive improvement in corrosion protection provided by the methods of the present invention has not been attainable with prior art methods when system metals are in contact with significantly higher residuals of aggressive ions (e.g., chloride and sulfate) and the accompanying greater ionic or electrolytic strength present in the aqueous system water. Such high concentrations of corrosive ions result from either use of acid for scale control and/or concentration of source water ions in the aqueous system. As is known, corrosion rates generally increase proportionately with increasing ionic strength. Accordingly, with the methods ability to protect system metals exposed to this increased electrolytic corrosion potential, opportunity for water conservation and environmental benefits that result with elimination or reduction of system wastage (blowdown) relied on by previous methods to reduce corrosion or scaling problems in aqueous systems can be readily realized through the practice of the methods disclosed herein.

Additional modifications and improvements of the present invention may also be apparent to those of ordinary skill in the art. Thus, the particular combination of parts and steps described and illustrated herein is intended to represent only certain embodiments of the present invention, and is not intended to serve as limitations of alternative devices and methods of the present inventions within the spirit and scope of the invention. For example, since the methods of the present invention provides both effective silicate scale control and corrosion inhibition when using high silica or high dissolved solids source waters, extensive variation in source water quality can be tolerated. These source waters might otherwise be unacceptable and uneconomical for use in such aqueous systems. In addition, such modifications may include, for example, using other conventional water treatment chemicals along with the methods of the present invention, and could include other scale inhibitors, such as for example phosphonates, to control scales other than silica, corrosion inhibitors, biocides, dispersants, defoamers and the like. In addition, such modifications may include, for example, using organic base silicates, organic chelates of silicon, hydrogen-bonded complexes with polar organic compounds, combinations with organic polymers, and simple addition of such organic ion species that are capable of reacting with or impacting the transformation of silica monomer in this method process for polymerization and growth of silica particles to impact stability and deposition of silica particles that provide protective films on metal surfaces for corrosion inhibiting benefit. Accordingly, the present invention should be construed as broadly as possible.

As an illustration, below there are provided non-restrictive examples of an aqueous water system that has been treated with methods conforming to the present invention.

EXAMPLES OF SOLUBLE SILICA STABILIZATION METHOD

The following analytical tests were performed on samples from cooling tower systems treated with the methods of the present invention to demonstrate the efficacy of the present invention for transforming source water monomeric and colloidal silica, and controlling the stability of soluble silica and silicate species at increased concentrations. Two samples of each of the following: 1) varying source water; 2) the resultant treated system water; and 3) tower sump insoluble accumulations. A total of six samples were analyzed from different operating time frames.

Although the exact mechanism of action of the process is not completely understood, the methods of the present invention minimize the turbidity of the treated water, which is considered a demonstration of effective soluble silica stabilization and control of amorphous silica deposition. Methods that produce treated water of less than eight nephelometric turbidity units (NTU) are considered improvements over typical aqueous cooling system insoluble particle suspensions or dispersions content. Turbidity measurements (Table 1) performed on samples taken from the cooling systems, before and after filtration through a 0.45-micron filter, illustrate effective silicate inhibition in the treated water. The turbidity levels are well below typical cooling tower systems, in particular at such high concentrations (80 COC), and indicate the methods of the present invention provide controlled non-adherent precipitation of excess silica and other insoluble materials entering the system. Clean heat exchanger surfaces have confirmed that the method silica precipitation is non-adherent. The precipitated silica forms are contained in the cooling tower sump. However, the volume of precipitant and scrubbed accumulations in the tower sump were not appreciably greater than previous treatment methods due to reduction of insoluble polyvalent salt precipitates by pretreatment removal of their ions.

TABLE 1

Tower Water Turbidity Analyses

| | | |
|---|---|---|
| Sample No. 1: | (Turbidity, NTU) | Neat, 4 NTU; Filtered, 2 NTU |
| Sample No. 2: | (Turbidity, NTU) | Neat, 3 NTU |

The cooling tower and makeup water analytical tests performed in Table 2 and Table 3 illustrate the effectiveness of the methods of the present invention in maintaining higher levels of soluble silica in the cooling tower system when parameters are controlled within the method specified control ranges. Soluble silica residuals are present at 306 and 382 mg/L in these tower samples at the respective 9.6 and 10.0 pH levels. The lower chemical concentration ratios (COC) for silica in these tower samples, as compared to the higher cycled residuals for soluble chemistries (chloride, alkalinity, conductivity), indicate that some of the excess silica may be precipitating as non-adherent material, and accumulating in the tower basin. A significant proportion of the silica expected to concentrate from the source water would not be detected by analytical procedure since condensation and adsorption growth into large colloidal particles does not permit detection of the original number of smaller soluble silica particles. However, deposition of amorphous silica forms is confirmed by the ratio of amorphous silica found in the tower basin deposit analyses. System metal and heat exchange surfaces were free of silica or other scale deposits.

TABLE 2

Cooling Tower Sample No. 1/Makeup/Residual Ratios (COC)

| SAMPLE/TESTS | Tower | Makeup (soft) | COC |
|---|---|---|---|
| Conductivity, μmhos (Un-neutralized) | 33,950 | 412 | 82.4 |
| pH | 10.01 | 8.23 | NA |
| Turbidity, NTUs | | | |
| Neat | 3 | 0.08 | NA |
| Filtered (0.45μ) | — | — | — |
| Copper, mg/L Cu | ND | ND | NA |
| Zinc, mg/L | ND | ND | NA |
| Silica, mg/L $SiO_2$ | 382 | 9.5 | 40.2 |
| Calcium, mg/L $CaCO_3$ | 16.0 | 0.20 | NA |
| Magnesium, mg/L $CaCO_3$ | 3.33 | 0.05 | NA |
| Iron, mg/L Fe | ND | ND | NA |
| Aluminum, mg/L Al | ND | ND | NA |
| Phosphate, mg/L $PO_4$ | ND | ND | NA |
| Chloride, mg/L | 6040 | 80 | 75.5 |
| Tot. Alkalinity, mg/L | 13200 | 156 | 84.6 |

ND = Not Detectable; NA = Not Applicable; COC = Cycles of Concentration

TABLE 3

Cooling Tower Sample No. 2/Makeup/Residual Ratios (COC)

| SAMPLE/TESTS | Tower | Makeup (soft) | COC |
|---|---|---|---|
| Conductivity, μmhos (Un-neutralized) | 66,700 | 829 | 80 |
| pH | 9.61 | 7.5 | NA |
| Turbidity, NTUs | | | |
| Neat | 4 | 0.08 | NA |
| Filtered (0.45μ) | 2 | — | — |
| Zinc, mg/L | ND | ND | NA |
| Silica, mg/L $SiO_2$ | 306.4 | 11 | 28 |
| Calcium, mg/L $CaCO_3$ | 21.5 | 0.20 | NA |
| Magnesium, mg/L $CaCO_3$ | 0.65 | 0.05 | NA |
| Iron, mg/L Fe | ND | ND | NA |
| Aluminum, mg/L Al | ND | ND | NA |
| Phosphate, mg/L $PO_4$ | ND | ND | NA |

ND = Not Detectable; NA = Not Applicable; COC = Cycles of Concentration

Microscopic and chemical analysis of deposit samples from accumulated residue in the tower basin of a system treated by present methodology are shown in Exhibit 1 and Exhibit 2. Both analyses illustrate the significant ratio of amorphous silica and silica materials in the deposit. The major proportion of this silica is the probable result of silica adsorption or reaction with insoluble precipitates of PVM ions as introduced and concentrated in the tower water, or amorphous silica precipitation with attainment of elevated MVM ion concentrations. Visual inspections of heat transfer equipment in the system treated by this method have confirmed that it has remained free of silica and other scale deposits. System heat transfer efficiencies were also maintained at minimum fouling factor levels.

Exhibit 1

MICROSCOPICAL ANALYSIS—POLARIZED LIGHT MICROSCOPY

Deposit Designation: Cooling Tower Basin Deposit

| % ESTIMATED | CONSTITUENTS |
|---|---|
| >30 | Amorphous silica, including assorted diatoms, probably including amorphous magnesium silicate; calcium carbonate (calcite) |
| 1-2 | Assorted clay material including feldspar; hydrated iron oxide; carbonaceous material |
| <1 | Silicon dioxide (quartz); assorted plant fibers; unidentified material including possibly aluminum oxide (corundum) |

Exhibit 2

CHEMICAL ANALYSIS—DRIED SAMPLE

Deposit Designation: Cooling Tower Basin Deposit

| % ESTIMATED | CONSTITUENTS |
|---|---|
| 12.1 | CaO |
| 8.5 | MgO |
| 5.2 | $Fe_3O_4$ |
| 3.7 | $Fe_2O_3$ |
| <0.5 | $Al_2O_3$ |
| 13.2 | Carbonate, $CO_2$ |
| 51.1 | $SiO_2$ |
| 5.7 | Loss on Ignition |

Most probable combinations: Silica ~54%, Calcium Carbonate

CHEMICAL ANALYSIS—DRIED SAMPLE

Deposit Designation: Cooling Tower Basin Deposit

% ESTIMATED CONSTITUENTS

~32%, Oxides of Iron ~9%, Mg and Al Oxides ~5%.

EXAMPLES OF CORROSION INHIBITION METHODS OF THE PRESENT INVENTION

The data in Table 4 illustrate the effectiveness of the methods of the present invention in inhibiting corrosion for carbon steel and copper metals evaluated by weight loss coupons in the system. No pitting was observed on coupon surfaces. Equipment inspections and exchanger tube surface testing have confirmed excellent corrosion protection. Comparable corrosion rates for carbon steel in this water quality with existing methods of the present inventions are optimally in the range of 2 to 5 mpy.

TABLE 4

CORROSION TEST DATA

| | Specimen Type | |
|---|---|---|
| | Carbon Steel | Copper |
| Test location | Tower Loop | Tower loop |
| Exposure period | 62 Days | 62 Days |
| Corrosion Rate (mpy) | 0.3 | <0.1 |

What is claimed is:

1. A method for inhibiting corrosion of a metallic substrate in an aqueous system wherein said aqueous system derives water, and silica contributed by source water, from make-up of source water, the method of the present invention comprising the steps:
    a) removing polyvalent metal (PVM) ions from said source water;
    b) controlling the monovalent metal (MVM) ion concentration of the aqueous system water such that said aqueous system water possesses an MVM ion concentration that exceeds the soluble silica concentration;
    c) elevating and maintaining the pH of said aqueous system water such that said aqueous system water possesses a pH of approximately 7.0 or greater; and
    d) concentrating said source water and its natural silica content by evaporation of makeup water in an aqueous system where the system water temperature is higher than the makeup water temperature, and said system water is circulated in contact with heat transfer surfaces that elevate such portion of water to even higher temperatures; wherein
    e) performing steps a)-d) operatively transforms said natural silica content to corrosion inhibiting silica forms.

2. The method of claim 1 wherein in step a), said PVM ions prevalently comprise ions of calcium and magnesium.

3. The method of claim 1 wherein said aqueous system water contains soluble $SiO_2$ of a concentration greater than 10 mg/L.

4. The method of claim 3 wherein said aqueous system water contains soluble $SiO_2$ of a concentration that is between 10 mg/L to saturation concentrations.

5. The method of claim 3 wherein said aqueous system water contains soluble $SiO_2$ at saturation residuals for a given pH, MVM ions concentration and temperature.

6. The method of claim 1 wherein in step a), sufficient PVM ions are removed such that the resulting PVM ions concentration is equal to or less than approximately 10% of the $SiO_2$ concentration within said source water, for inhibiting corrosion of said metallic substrate.

7. The method of claim 6 wherein in step a), sufficient PVM ions are removed such that the resulting PVM ions concentration is equal to or less than approximately 2% of the $SiO_2$ concentration within said source water.

8. The method of claim 1 wherein in step c), said pH is maintained at 8.0 or higher.

9. The method of claim 1 wherein in step a), said PVM ions are removed via a method selected from the group consisting of ion exchange, selective ion removal with reverse osmosis, reverse osmosis, electro chemical removal, chemical precipitation, evaporation and distillation.

10. The method of claim 1 wherein in step c), said pH is increased by adding a MVM alkali agent.

11. The method of claim 10 wherein said alkali agent comprises sodium carbonate.

12. The method of claim 1 wherein in step c), said pH is elevated by evaporating a portion of said aqueous system water.

13. The method of claim 1 wherein in step c), said pH is elevated by distilling a portion of said aqueous system water.

14. The method of claim 1 wherein said metallic substrate is selected from the group consisting of mild steel, copper, stainless steel, aluminum, zinc, galvanized steel and various alloys of such metals.

15. The method of claim 1 wherein prior to step a), the method comprises the step:

analyzing said source water to determine the total available concentration of $SiO_2$ present therein.

16. The method of claim 1 wherein in step b), said MVM ion concentration of said aqueous system water is controlled such that said aqueous system water possesses a 0.1 N to 0.2 N concentration of MVM ions.

17. The method of claim 1 wherein in step b), said MVM ion concentration of said aqueous system water is controlled such that said aqueous system water possesses a 0.3 N or greater concentration of MVM ions.

18. The method of claim 1 wherein in step d), said system water is selected from the group consisting of water utilized for cooling processes, water utilized for cooling tower systems, water utilized for evaporative cooling, water utilized for cooling lakes or ponds, and water utilized for indirect cooling of enclosed or secondary cooling and heating loops.

19. The method of claim 4 wherein said aqueous system water contains soluble $SiO_2$ of at least 300 mg/L.

* * * * *